Feb. 13, 1962 J. H. MacNEILL Re. 25,123

HIGH SPEED PUNCH DEVICE

Original Filed March 19, 1956 4 Sheets-Sheet 1

INVENTOR
John H. MacNeill

BY Howard L. Rose

ATTORNEY

HIGH SPEED PUNCH DEVICE

Original Filed March 19, 1956 4 Sheets-Sheet 2

INVENTOR
John H. MacNeill

BY Howard L. Rose

ATTORNEY

HIGH SPEED PUNCH DEVICE

Original Filed March 19, 1956 4 Sheets-Sheet 3

INVENTOR
John H. MacNeill

BY Howard L. Rose

ATTORNEY

HIGH SPEED PUNCH DEVICE

Original Filed March 19, 1956 4 Sheets-Sheet 4

INVENTOR
John H. MacNeill

BY Howard L. Rose

ATTORNEY

United States Patent Office

Re. 25,123
Reissued Feb. 13, 1962

25,123

HIGH SPEED PUNCH DEVICE

John H. MacNeill, Melbourne, Fla., assignor to Soroban Engineering, Inc., Melbourne, Fla., a corporation of Florida Original No. 2,859,816, dated Nov. 11, 1958, Ser. No. 572,508, Mar. 19, 1956. Application for reissue Feb. 21, 1961, Ser. No. 90,899
38 Claims. (Cl. 234—115)

Matter enclosed in heavy brackets [ ] appears in the original patent but forms no part of this reissue specification; matter printed in italics indicates the additions made by reissue.

The present invention relates to punch devices and more particularly to a high-speed punch device for perforating record members.

It is a primary object of the present invention to provide a simple, compact and reliable punching mechanism capable of operation at high speeds and having a long life.

It is another object of the present invention to provide a high speed punch capable of performing at least 200 punching operations per second.

Another object of the present invention is to provide a high speed punch mechanism for perforating a perforatable record member wherein springs have been eliminated from the apparatus except in a pawl and ratchet mechanism.

Still another object of the present invention is to provide a high-speed record member perforator utilizing a plurality of aligned punches, a punch actuating bail and an interposer system for selectively coupling the punch bail to the punches wherein positive return of the punches and the punch interposers is provided so as to eliminate the necessity for spring return of punches and interposers and thereby substantially eliminate resonant effects, increase obtainable speeds of operation and decrease power requirements of the apparatus.

Yet another object of the present invention is to provide a high-speed punch for perforating a perfortable record member utilizing a plurality of aligned punches for perforating the record member and a feed mechanism for intermittently advancing the record member, and further providing a punch actuating and a feed actuating mechanism and punch interposers and a feed interposer for selectively coupling the punch and feed actuating mechanisms, respectively, to the punches and the feed mechanism, and further providing positive return of the feed interposer to its inoperative position, the feed interposer return mechanism being operatively coupled to the punch actuating mechanism for operation thereby at an appropriately timed interval in the cycle of operation of the punch apparatus.

It is another object of the present invention to provide a high-speed punch apparatus for perforating a perforatable record member having a plurality of aligned punches for perforating the record member and a feed apparatus for feeding the record member between punching operations, and further having a punch actuating mechanism and a feed actuating mechanism and punch and feed interposers for operatively coupling the punch actuating mechanism to the punches and the feed actuating mechanism to the feed mechanism, and further including a restoring bail for restoring the punch interposers to their inoperative position, the restoring bail being operatively coupled to a drag link interconnecting the punch actuating mechanism and the feed actuating mechanism for proper timing of the restoring operation.

Yet another object of the present invention is to provide a high-speed punch device for perforating a perforatable record member having a punch actuating mechanism and a feed actuating mechanism driven by punch and feed cam followers, respectively, and utilizing a unitary cam for driving the punch cam follower and the feed cam follower, to thereby maintain the cam followers in isochronism.

A further object of the present invention is to provide a drive mechanism for a high-speed punch utilizing a constant diameter triangular cam for driving a punch actuating mechanism; the constant diameter cam providing a period of inactivity of the punch actuating mechanism, during which punch interposers may be inserted for operatively connecting the punch actuating mechanism to one or more selected punches.

Yet another object of the present invention is to provide a drive mechanism for a high-speed punch device utilizing a punch actuating mechanism, a plurality of punches, and punch interposers for selectively coupling the punch actuating mechanism to the punches; the drive mechanism utilizing a constant diameter triangular cam for providing a period of inactivity of the punch actuating mechanism during which the punch interposers may be moved into position to couple the punch actuating mechanism to the punches; the constant diameter cam thereafter providing an interval of low velocity during which the punch interposers are clamped between the actuating mechanism and the punches, the low velocity interval minimizing impact loads on the punch and other members of the apparatus.

Yet another object of the present invention is to provide a high-speed punch device for perforating a perforatable record member utilizing a feed mechanism for feeding the record member between punching operations, a feed actuating mechanism and a selectively actuatable feed interposer for operatively coupling the feed actuating mechanism to the feed mechanism; the feed interposer being actuatable at the repetition rate of the feed actuating mechanism and at subsynchronous rates.

The above and still further features, objects, and advantages of the invention will become apparent upon consideration of the following detailed description of a specific embodiment of the invention, especially when taken in conjunction with the accompanying drawings, wherein.

Figure 1:
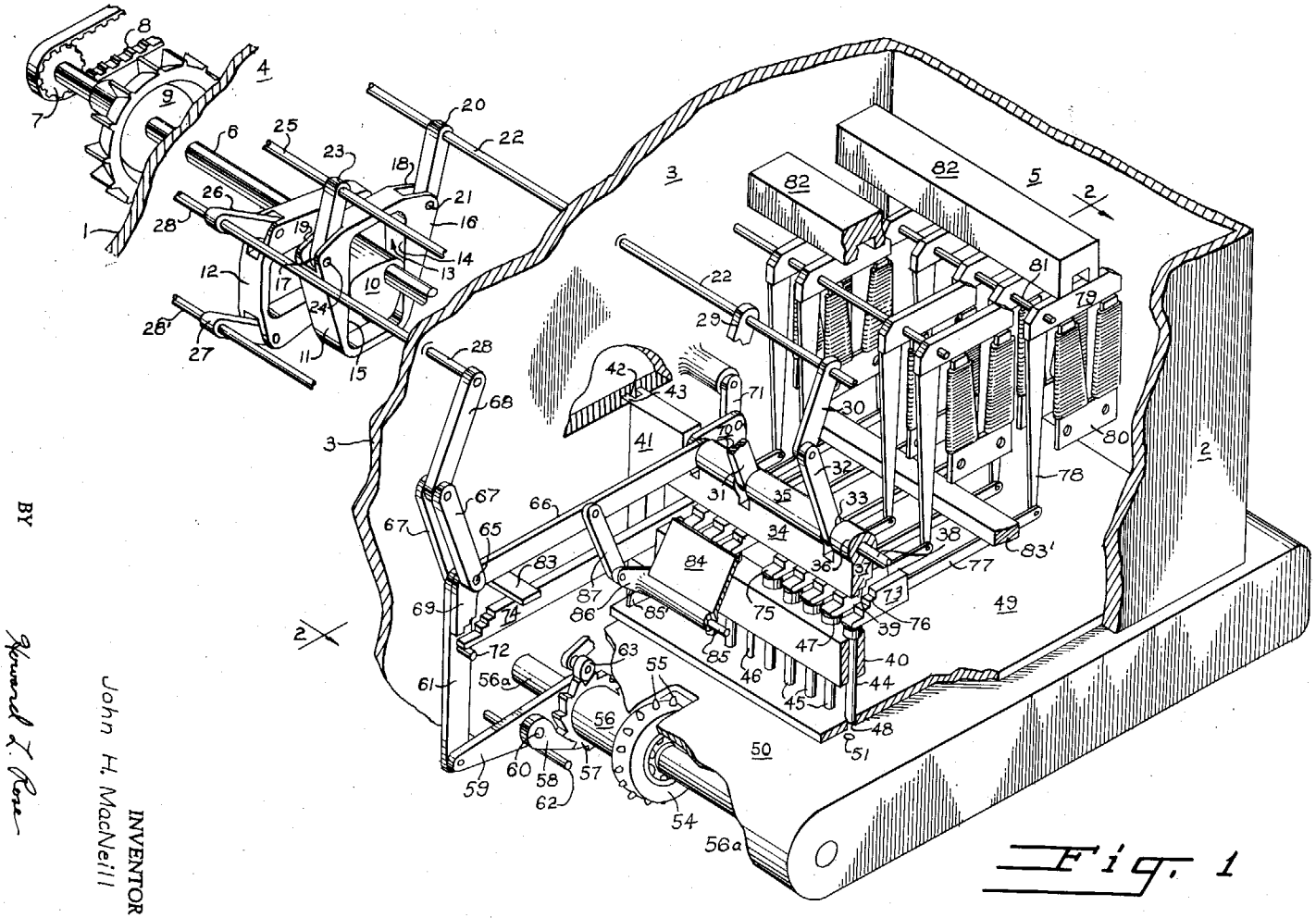
FIGURE 1 is a perspective view of the punch device of the present invention illustrating the mechanical details thereof.

Referring now more particularly to FIGURE 1 of the accompanying drawings, the apparatus of the present invention is provided with a case having vertical side walls 1 and 2 and an intermediate vertical wall 3 which subdivides the case into two compartments 4 and 5, the vertical walls 1, 2 and 3 being partially broken away to more clearly disclose the apparatus of the invention. Included within the compartment 5 are the punching and feeding mechanisms of the apparatus and included within the compartment 4 is a mechanism for driving the punching and feeding mechanisms in isochronism. The mechanism included within the compartment 4 includes a shaft 6 perpendicular to and rotatably mounted in the vertical walls 1 and 3. The shaft 6 extends through the wall 1 and has secured thereto a drive sprocket 7 driven by means of a belt 8 from a conventional source of rotary motion (not illustrated). Mounted on the shaft 6, for rotation therewith, is a cooling turbine 9 for cooling the apparatus by means of forced air draft. Secured to the shaft 6 within the compartment 4 is an elongated constant diameter triangular cam 10, the axis of the shaft 6 extending through the center of the radius of curvature of one of the surfaces of the cam 10. The cam 10 is called a constant diameter cam since the distance between any two diametrically opposed points on its surface is equal to the distance between any two other diametrically opposed points on its surface. The cam 10 is elongated along the axis of the shaft 6 so that it may cooperate with and drive two cam followers 11 and 12. The cam follower 11 has a generally rectangular central aperture 13, the cam 10 being disposed within this aperture. The aperture 13 provides two cam engaging surfaces 14 and 15, the distance between them being equal to the diameter of the constant diameter cam 10 so that opposed points on the surfaces 14 and 15 are maintained in contact with the cam 10. In order to reduce wear on the cam 10 and cam engaging surfaces 14 and 15, the cam follower 11 is elongated along the axis of the shaft 6 to provide a relatively large area of contact between the cam 10 and the surfaces 14 and 15. The surfaces of the cam follower 11 perpendicular to the axis of the shaft 6 extend outwardly from the main body of the cam follower 11 so as to provide lugs 16, 17, 18 and 19. One end of a link 20 is positioned between the lugs 16 and 18 and is pivotally secured to the cam follower 11 by means of a pivot pin 21 extending parallel to the shaft 6. The other end of the link 20 is secured to a shaft 22 perpendicular to and rotatably mounted in the vertical wall 3, the shaft 22 extending through both of the compartments 4 and 5. Alternatively the shaft 22 may be mounted in wall 3 and supported by a bracket secured to and extending from wall 3.

A second link 23 has one end positioned between and pivotally secured to the lugs 17 and 19 by means of a pivot pin 24 and has its other end pivotally secured to a shaft 25 which is perpendicular to and mounted in the vertical wall 3. The cam follower 12 is identical in all respects with the cam follower 11 except that the cam engaging surfaces of the follower 12 are disposed at approximately 120°, for example, only, to the cam engaging surfaces of the follower 11 for purposes to be described subsequently. Links 26 and 27 each have one end pivoted to adjacent corners of the cam follower 12, and the other end of the link 26 is secured to a shaft 28 extending perpendicular to and rotatably mounted in the vertical walls 1 and 3, the shaft 28 extending through the wall 3 and into the compartment 5. The other end of the link 27 is pivotally secured to a shaft 28' mounted in wall 1. The shafts 22, 25, 28 and 28' are all partially broken away to clarify the illustration. Upon rotation of the shaft 6 and consequently of the cam 10, near-perfect reciprocating motion is imparted to the cam followers 11 and 12. As a result of the fact that the cam followers 11 and 12 contact two opposed surfaces of the cam 10, they are always positively positioned with respect to the cam, and spring loading of the cam followers may be eliminated. Elimination of spring loading of the cam followers 11 and 12 provides a drive apparatus free of resonant effects, spring fatigue and wear problems, and provides an apparatus wherein none of the force supplied by the rotating shaft 6 must be utilized to overcome the force of cam follower springs. Thus, for a given load on the shafts 22 and 28 twice the work for a given contact area and pressure can be realized from this cam follower arrangement as from spring-loaded cam follower arrangements. In order to reduce wear of the cam 10 and cam followers 11 and 12, and also in order to materially reduce the noise incident upon the use of the apparatus, the compartment 4 may be filled with oil or other suitable lubricating liquid. Additional advantages deriving from the utilization of a constant diameter triangular cam will be discussed in conjunction with the feed and punch actuating mechanisms.

Figure 3:
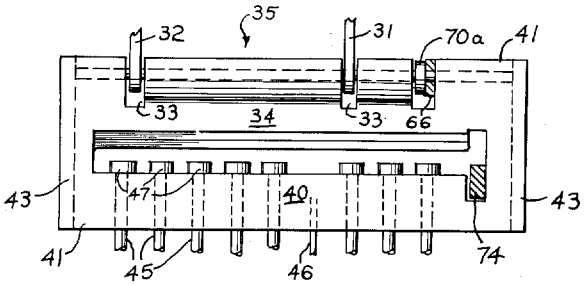
FIGURE 3 is a deailed view of the punch bail employed in the present invention.

Proceeding with the description of the apparatus, the section of the shaft 22 within the compartment 5 has secured thereto, at spaced points along its axis, the upper ends of punch links 29 and 30. The lower ends of the toggles 29 and 30 are pivoted to the upper ends of punch links 31 and 32, the lower ends of which extend into vertical slots 33 formed in an upper member 34 of a punch bail 35 (see FIGURES 1 and 3). The upper member 34 of the punch bail 35 is elongated perpendicular to the wall 3 and is provided with a cylindrical head section 36 and a downwardly depending generally rectangular section 37. A shaft 38 extends through the cylindrical head portion 36, the shaft 38 and cylindrical head portion 36 being co-axial. The lower ends of the punch links 31 and 32 extend into the slots 33 of the bail 35 and are pivotally secured to sections of the shaft 38 which are exposed by the slots 33. The lower surface of the generally rectangular portion 37 of the punch bail 35 is provided with a stair-stepped face 39, for cooperation with a complementary face on a punch interposer as will be described subsequently. The punch bail 35 further comprises a lower member 40, positioned vertically below the upper member 34, and two guide members 41 (only one of which is illustrated in FIGURE 1) which cooperate with walls 2 and 3 to guide the entire punch bail 35, for movement in the vertical direction, only. The rectangular section 37 and the lower member 40 of the bail 35 extend horizontally into engagement with the members 41 and are suitably secured thereto, or formed integrally therewith to provide a unitary bail structure as illustrated in FIGURE 3. The members 41 of the punch ball 35 are provided with two horizontally extending vertically elongated bars 43 (only one pair of which is illustrated) received in rectangular grooves 42 in the vertical wall 3, and guide near cover 2. The legs 42 of the bail 35 reciprocate vertically in the rectangular grooves 43 but are restrained from horizontal motion by the sides of the grooves. Alternatively the bail 35 may be guided vertically by suitably supported vertical pins, extending through apertures in portions 41 of the bail 35.

The lower member 40 of the bail 35 is provided with a plurality of transversely aligned, vertically extending apertures 44 which slidably receive therein a plurality of punches or punch pins 45 each weighing only a few grams. Eight such punches are illustrated, although it is to be understood that the invention is not limited to the utilization of any specific number of punches, the number of punches being determined by the overall system in which the punch device is to be utilized. An additional punch 46 is provided for punching feed holes in the record member, the punch 46 being secured to the section 40 of bail 35 and reciprocating therewith. The punches 45 are each provided with an enlarged head portion 47 greater in diameter than the apertures 44. The head portions 47 rest on the upper surface of the member 40 of the bail 35, the cooperation between the head portions 47 and the upper surface of bail section 40 constituting the vertical force for withdrawing the punches 45. The punches 45 extend downwardly from the member 40 of the bail 35, and into a plurality of apertures 48 in a plate 49, the apertures 48 guiding the punches 45 laterally. The plate 49 constitutes the bottom wall of the compartment 5 and is secured to the vertical wall 3. A relatively loose fit is provided between the punches 44 and member 40 while a relatively tight fit is provided between the punches 44 and the bottom wall 49. A small amount of oil is maintained in the apertures 48 to provide viscous damping of the punches 44 for purposes which will become apparent as the description proceeds.

Positioned immediately below the bottom wall 49 is a die plate 50, having apertures 51 aligned with the apertures 48 in the plate 49. The die plate 50 is spaced from the bottom wall 49 of the compartment 5 by a sufficient distance to allow the passage of a record member to be perforated therebetween. The record member may take any form such as a punch tape, punch card or any other member in which it is desired to provide a determinable configuration of perforations or marks. Secured to the underside of a plate 50 is a U-shaped trough which provides a chad receiving compartment. Air blast from the cooling turbine 9 is routed through the trough and chad is exhausted to the rear through a suitably dimensioned port. Mounted forward of the punch die plate 50 is a sprocket 54 having pins 55 for engaging a row of feed perforations in the record member for driving the record member. The sprocket 54 is secured to a hollow shaft 56, which is perpendicular to the wall 3. The hollow shaft 56 is coaxial with and rotatably mounted on a shaft 56a perpendicular to and rotatably secured in the side walls of the chad receiving compartment 53. Secured to the shaft 56 is a ratchet 57 intermittently driven by a pawl 58 rotatably mounted intermediate the ends of a link 59 by means of a pivot pin 60. One end of the link 59 is pivotally secured to a vertical feed rod 61. The other end of the link 59 is rotatably mounted on the shaft 56a and the pawl is spring-biased by a rubber snubber (not illustrated) into engagement with the ratchet 57. It should be pointed out that the pawl snubber comprises one of the two springs utilized in the entire punch device of the present invention. A pawl-stop 62 is provided to limit the travel of the pawl so as to limit the maximum travel of the ratchet upon each downward movement of the feed-rod 61. Once accelerated, the inertia of the tape, sprocket 54, shaft 56, and ratchet 57 would normally carry the assembly past its desired position if a positive positioning mechanism were not employed. However, upon partial overshoot, the ratchet 57 jams the fully depressed pawl 58 against the pawl-stop 62, thereby blocking further ratchet travel. If partial overshoot occurs, a spring loaded detent 63 aids return of the ratchet to its proper position and holds it there. The detent is a roller mounted on a spring loaded arm 63' and is positioned to engage the end portions of teeth of the ratchet 57.

The upper end of the feed-rod 61 is provided with a slotted aperture 64 (see FIGURE 2) through which extends a pivot pin 65, perpendicular to the side wall 3. The pivot pin 65 also extends through a circular aperture in one end of a drag link 66 and is rotatably positioned therein. The pivot pin 65 is secured between the lower ends of the two feed links 67, the upper ends of which are pivoted to the lower end of a feed link 68. The upper end of the feed link 68 is secured to the end of the shaft 28 positioned within the compartment 5. The drag link 66 has a downwardly-turned portion to provide a feed bail 69 horizontally aligned with the upper portion of the feed rod 61 and is positioned vertically above a stud 72, extending horizontally outward toward the wall 2 from the feed rod 61. The other end of the drag link 66 is pivotally secured to the end of the shaft 38 between the members 34 and 41 of the bail 35. Also pivotally secured to the aforesaid end of the shaft 38 is one arm 70a of a bell crank 70 having a second arm 70b. The bell crank 70, at the junction of its two arms 70a and 70b, is pivoted to the lower end of a stationary vertical link 71.

The vertical motion imparted to the punch bail 35 and feed bail 69, by the links 29 to 32 and 67 and 68 respectively, is insufficient to bring the bails into engagement within the punches 45 and the stud 72 respectively. The slotted aperture 64 in the feed rod 61 prevents downward movement of the link 67 from being directly imparted to the feed rod 61. The apparatus utilizes a plurality of punch interposers 73, one for each punch 45, for providing a mechanical coupling between the punch bail 35 and punches 45 to produce a punching operation and a feed interposer 74 for mechanically coupling the feed bail 69 to the stud 72 to produce a feed operation. The punch interposers 73 are horizontally slidable between a spacing or inactive position and a marking or punch actuating position and are illustrated in the spacing position in FIGURE 1. The interposers 73 are provided at the forward end thereof with a foot portion 75, the lower surface of which rests upon the heads 47 of the punches 45 under of stair-faced portion 39 of the bail 35 when the interposers are in their spacing position. The vertical height of the foot 75 is insufficient to be contacted by the bail 35 even when the bail 35 is in its lowermost position and therefore when the interposer 73 is in its spacing position a punching operation cannot occur. The foot 75 terminates in an upwardly extending stair-step portion 76 which is complementary to the stair-step configuration 39 of the punch bail 35. The other end of each interposer 73 is connected by means of a horizontal link 77 to the lower end of a vertical link 78, the links 77 and 78 being pivoted one to the other. The upper end of each link 78 is secured to an armature 79 of a solenoid 80, the solenoids 80 being fixedly secured to the case members by suitable supports (not shown). The armature 79 of the solenoids 80 are pivoted about a shaft 81 extending perpendicular to and secured to the wall 3, the shaft 81 being positioned rearwardly of the vertical arms 78. The solenoids 80 are arranged in two banks or rows so as to facilitate the location of the solenoids in a relatively narrow space. Positioned above the armatures 79 of each bank of solenoids 80 is a permanent magnet 82 which serves to maintain the armatures 79 in the up or unactuated position. The magnets 82 are employed in place of springs so as to reduce the possibility of resonance in this part of the apparatus, as well as to provide a faster armature action by virtue of a decreasing detent force as the armatures move toward their solenoids.

The solenoids 80 are selectively energized by an external source of electrical pulses (not illustrated) which may be arranged to supply pulses to the solenoids 80 in accordance with any known code, such as binary, trinary, hexadecimal, etc., or may supply a single pulse at a time to effect punching of the record at a single predetermined location during each punch cycle. Upon energization of a solenoid 80 its associated armature 79 is pulled down causing it to rotate about the shaft 81 and impart a forward motion to the link 78 which is transmitted through the link 77 to the interposer 73. The interposer 73 is thereby slid forward on the head 47 of punch 45 and the stair-step configuration 76 of the interposer is positioned immediately below the stair-step configuration 39 of the bail 35. Thus, when the bail descends, each selected interposer 73 is clamped between the bail 35 and a punch 45 and a positive downward movement is imparted to the punch 45 to produce a punching operation.

The feed mechanism is provided with a feed interposer 74 which has a forward end resting on the stud 72 of the feed rod 61. The feed interposer 74 is secured to one of the links 77 motivated by a solenoid 80 (illustrated in FIGURE 2) which when energized slides the feed interposer 74 forward on the stud 72. The interposer 74 is thereby positioned directly under the feed bail 69 to provide a mechanical coupling between the feed bail 69 and the stud 72, which coupling drives the feed rod 61 downwardly, to actuate the feed mechanism. A plate 83 extends outwardly from the wall 3 and engages the upper surface of the interposer 74 to restrict upward movement thereof, the plate 83 and stud 72 providing a vertical guide for the interposer 74. A plate 83' extending outwardly from wall 3 immediately above links 77 similarly restricts the vertical movement of the punch interposer 73.

Figure 2:
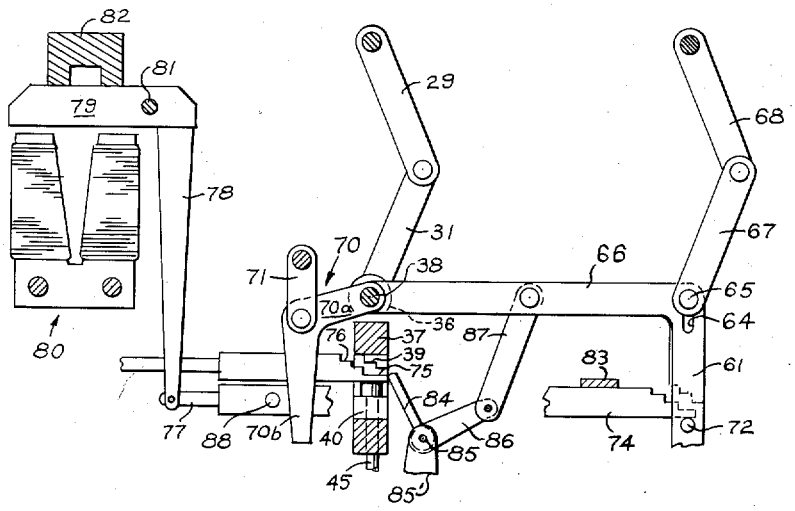
FIGURE 2 is a sectional view taken along line 2—2 of FIGURE 1.

In order to eliminate the necessity of providing springs for returning the interposers 73 and 74 to their spacing positions, positive interposer return has been employed in the apparatus of the present invention. A punch interposer restoring bail 84 has an upper portion thereof positioned immediately in front of and aligned with the foot portions 75 of the code interposers 73. The restoring bail 84 extends upwardly from and is mounted on a shaft 85 which is perpendicular to and pivotally secured to lugs 85', extending upward from and secured to the plate 49. A link 86 perpendicular to the restoring bail 84 has one end thereof secured to the bail 84 and the other end pivoted to one end of a link 87. The other end of the link 87 is pivoted to the drag link 66 approximately halfway between the pivot pin 65, of the feed link 67, and the shaft 38, which extends through the feed bail 35. Upon upward movement of the center of the drag link 66, the restoring bail 84 and shaft 85 are rotated about the center line of shaft 85 and the bail 84 presses against the forward end of the portion 75 of the code interposer 73 pushing them back to their spacing position where they are held by the magnets 82. In order to provide for positive return of the feed interposer 74, the interposer is provided with a stud 88 extending horizontally outward therefrom immediately adjacent the downwardly extending arm **70*b* of the bell crank 70 (see FIGURE 2). Upon downward movement of the shaft 38 to which the horizontal arm of the bell crank 70 is pivotally secured, the arm 70b is rotated rearwardly (as seen in FIGURES 1 and 2) and pushes against the stud 88, thereby returning the code interposer 74** to its terminal position.

Figure 4:
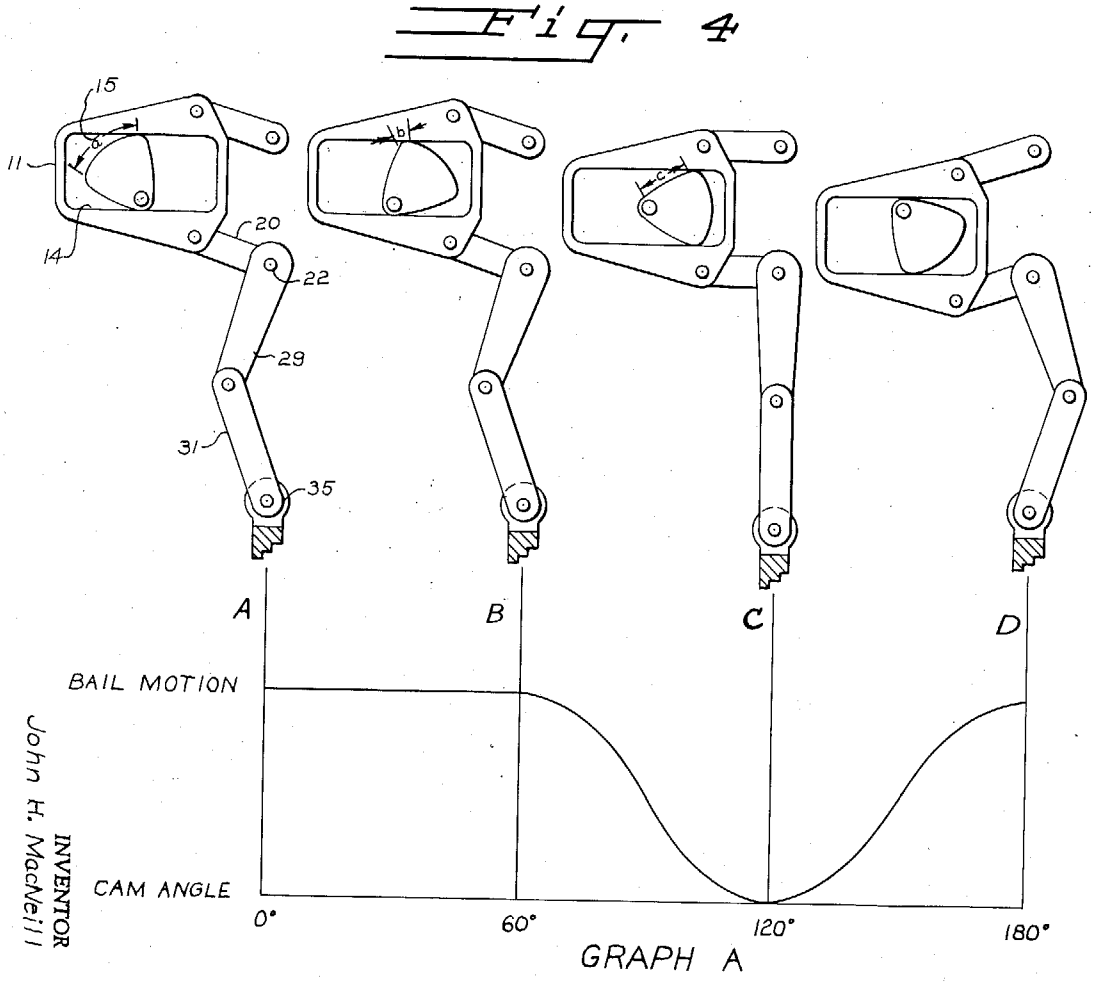
FIGURE 4 is a functional diagram illustrating the operation of the drive mechanism of the present invention.

Proceeding now to a description of the operation of the apparatus of the present invention, reference is initially made to FIGURE 4 for a detailed description of the punch and feed drive mechanism. The cam follower 11 is illustrated as rotated 90° with respect to the position shown in FIGURE 1 in order to prevent the punch links 29 and 31 from obscuring portions of the cam 10 and cam follower 11. The operation of the cam and cam follower and punch links is the same regardless of the position of the cam and cam follower in space. At the start of each punch cycle, which is chosen as 0° and illustrated as such in the graph of FIGURE 4, the cam follower 11 is shown in its uppermost position A with the beginning of a surface "a" of cam 10 having a constant radius with respect to the shaft 6, contacting the cam follower surface 15. The shaft 6 is rotated clockwise at about 100 revolutions/sec., for example only. Through the first 60 degrees of rotation of the cam 10, the cam follower 11 remains fixed in space since the surface "a" of the cam 10 remains at a fixed distance from the axis of the shaft 6 and no motion is imparted to the shaft 22. During this interval the link 20 is in its uppermost position and the punch links 29 and 31 are in their leftmost position, and are disposed at an angle to one another. The punch bail 35 is therefore in its uppermost position and during this first 60° interval the selected code interposers 73 may be inserted between the punch bail 35 and the punches 45.

Upon continued rotation of the shaft 6, a surface "b" of the cam 10 having a gradually decreasing displacement from the axis of the shaft 6 engages the cam follower surface 14 as illustrated in position B and the cam follower gradually moves downward in space. Downward movement of the cam follower 11 rotates the link 20 and therefore the shaft 22, counterclockwise, and the punch links 29 and 31, have their interconnected ends moved to the right tending to straighten out this coupling, and therefore gradually moving the punch bail 35 downward, this being illustrated in the graph by the portion of the graph just to the right of the 60° position. Upon downward movement of the bail 35 it would appear that all of the punches 45 would move downwardly with the heads 47 of the punches 45 remaining in contact with the section 40 of the bail 35 until the lower ends of the punches contact the record media. However, this is not the case. Taking into consideration the weight of the punches 45, only a few grams, the interval required for punching, approximately one-twelfth of the time required for one revolution of shaft 60 or one millisecond, and the viscous damping provided by the oil in the apertures 48, the unselected punches 45 fall only a very short distance, which is insufficient to bring them into contact with the record media. Continued downward movement of the bail 35 clamps the selected interposers 73 between the bail section 34 and the heads 47 of the punches 45. The distance between the record member and the punches 45 when they are in their upper position is quite small, only a few hundredths of an inch, so that this phase of the operation occurs during a few degrees of rotation of the shaft 6 when the bail 35 has a low velocity. As a result of the low velocity of bail 35 and the resilience of the interposers, the interposers 73 are gradually clamped and impact on the bail 35, punches 45 and interposers 73 is reduced. Upon continued downward movement of the bail 35 the punches reach their lowermost position at 120° of rotation of the shaft 6, when the punch links 29 and 31 are vertically aligned, as illustrated in position C.

Continued rotation of the shaft 6 brings a surface "c" of the cam 10, having a rapidly decreasing displacement from the axis of the shaft 6, into contact with the surface 14 of the cam follower 11 and the punch bail 35 is rapidly decelerated. Upon further rotation of the shaft 6, the links 29 and 31, having passed through their vertically aligned position, become displaced toward the right, thereby pulling the bail 35 rapidly upward. In moving upward, the upper surface of the bail section 40 pulls up the actuated punches 45 withdrawing them from the record member and thereafter picks up the unselected punches and returns all of the punches 45 to their terminal position at 180° of rotation of shaft 6, as illustrated at Position D, with the surface "a" contacting the cam follower surface 14. Consequently, the lower section 40 of the bail 35 provides positive return for all of the punches, whether selected or unselected and spring return of the punches is eliminated. The elimination of spring return of the punches 45 reduces the input power necessary to drive the punches and also eliminates resonant effects normally introduced by the use of springs in a high speed reciprocating mechanical system. The surface "a" of the cam 10, which was initially in contact with the same follower surface 15, is now in contact with the lower cam surface 14 and a dead period or period during which no motion is imparted to the cam follower 11 is again provided, for insertion of interposers for the next punch cycle.

It will be noted at this point that during each 180° of rotation of the shaft 6, the punch bail 35 is held at an uppermost position for 60°, driven from an uppermost position to a lowermost position at 120° and back to an uppermost position again at 180°. Therefore, the punch links 29 and 31 constitute a toggle-type frequency doubling mechanism which operates the punch bail 35 at twice the rate of the rotation of the shaft 6. As a result, the drive mechanism for shafts 22 and 28 may be operated at one-half the desired punching rate, thereby reducing high speed dynamic and wear problems in the drive mechanism below those that would be encountered if the frequency doubling linkage 29—31 were not employed and the shaft 6 was driven at twice the specified rate. It can be seen from the above that the utilization of a constant diameter cam 10 in conjunction with cam followers 11 and 12 having two cam contacting surfaces allows the cam follower to be maintained in contact with two diametrically opposed points on the surface of the cam, thereby providing positive positioning of the cam follower in space at all times and eliminating the necessity of a spring or springs for maintaining the cam follower in contact with the cam.

As a result of the elimination of springs for this purpose, the power requirements of the drive mechanism are reduced since the spring inertia and force need not be overcome, and, in addition, resonant effects normally introduced by spring biased cam followers are eliminated. In addition, the utilization of a constant diameter triangular cam having the axis of its driving shaft passing through the center of the radius of curvature of one of its sides provides an interval at the beginning of each punching cycle during which the cam follower 11, and therefore the punch bail 35, remain stationary. As a result, adequate time is permitted for the insertion of the punch interposers 73 at the beginning of each cycle. The interval during which the punches 44 are withdrawn from the record media is also sufficient, as will become apparent as the description proceeds, to allow the utilization of positive return of the interposers and spring return of the interposers is not required, thereby eliminating resonant effects normally introduced by the use of springs. The elimination of springs also allows more rapid operation of the device since the solenoids which drive the interposers need not overcome the force of a return spring. The constant diameter triangular cam provides an acceleration curve which approximates a square wave. However since there is negligible travel of the bails before they engage the interposers, and consequently engagement occurs when the bails have a low velocity, the bails appear to gradually clamp down on the interposers thereby minimizing impact loads on the punches 45 resulting in relatively noiseless operation and increased life of the apparatus.

Referring now to the record feed mechanism, the operation of the feed cam follower 12 and feed mechanism is substantially identical with that of the punch cam follower 11 and punch mechanism with the links 67 and 68 serving as a toggle-type frequency doubling linkage. The only difference between the operation of the feed and punch mechanisms lies in the method of returning the feed rod 61 to its upper position. The feed rod 61 is pulled up after a feeding cycle by the pivot pin 65 which engages the upper edge of the aperture 64 during upward movement of the links 67. In order to maintain a predetermined interval between the operation of the punch mechanism and the feed mechanism; that is, to maintain these two mechanisms in isochronism, the feed cam follower 12 cooperates with the same cam 10 that drives the punch cam follower 11. However, the surfaces of the cam follower 12 which contact the constant diameter cam 10 are rotated 120° with respect to the surfaces 14 and 15 of cam follower 11 so as to provide the necessary displacement in time between the operation of these two mechanisms. More specifically, a feed operation cannot occur while the punches are passing through or being withdrawn from the record member and conversely a punching operation cannot occur while the record member is being moved by the feed drive mechanism. Although the cam followers 11 and 12 are disposed at 120° mechanically with respect to one another, the frequency doubling mechanisms increase the angular displacement between operation of the feed and punch mechanisms to 240° of the cycle. Therefore, the cam followers 11 and 12 and unitary cam 10 maintain the feed and punch mechanisms in isochronism, the feed actuating mechanisms having a fixed 240° lag with respect to the punch actuation mechanism. It should be noted that although it is preferable to employ a single cam 10 and phase displaced cam followers 11 and 12, two phase displaced or aligned cams on a common shaft or on separate and synchronized shafts may be employed to cooperate respectively with two aligned or phase displaced cam followers.

Figure 5:
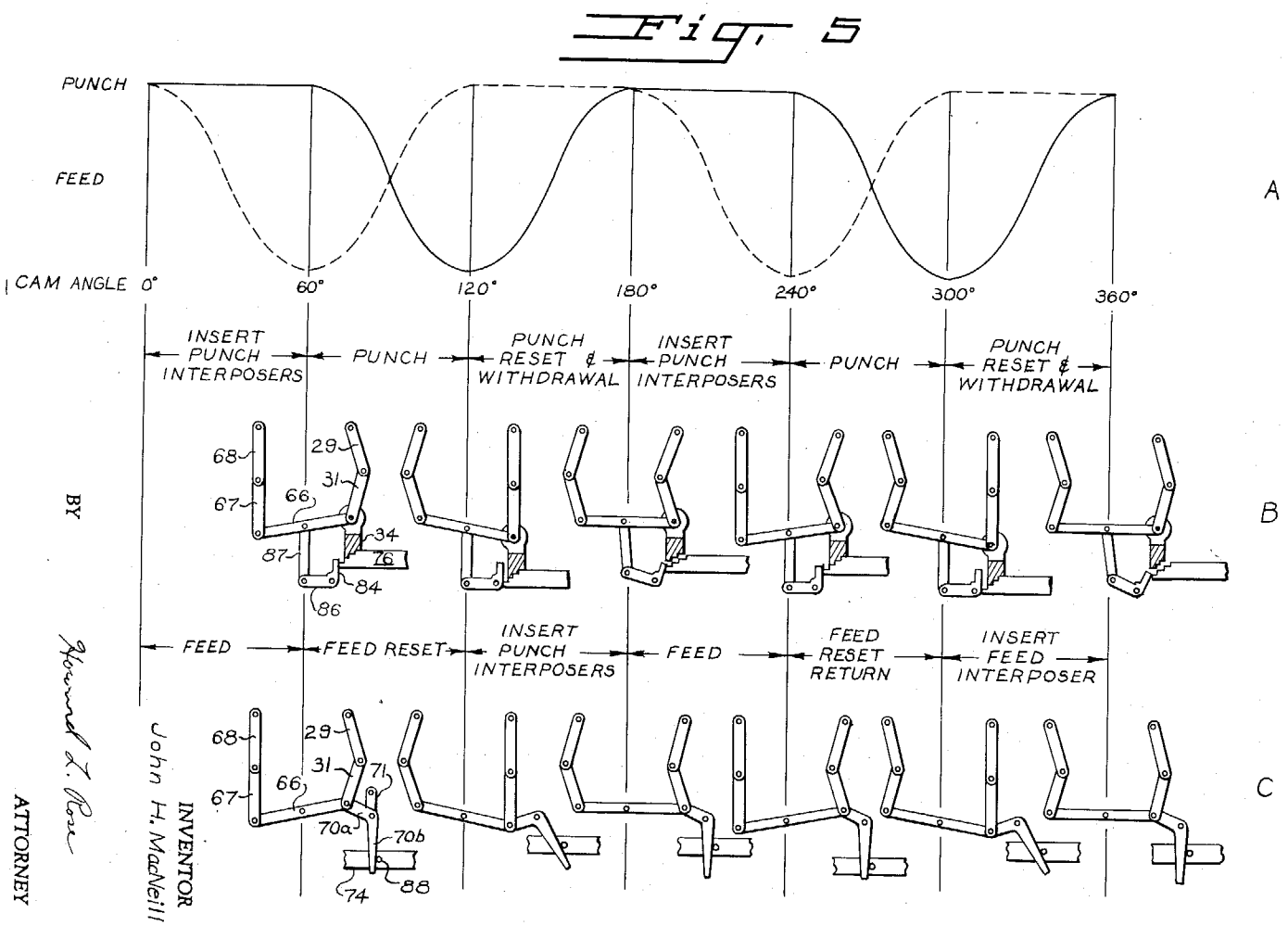
FIGURES 5A to C are functional diagrams illustrating the interrelationship between the cyclic operations of the feed and punch actuating and return mechanisms of the present invention.

Proceeding now to a description of the inter-related cyclic operation of the punch and feed mechanisms, reference is made to FIGURES 5A, 5B and 5C of the accompanying drawings. During the first 60° of rotation of the shaft 6, and 60° position of FIGURE 5 corresponding to the 30° position of FIGURE 4, the selected solenoids 80 are energized to move their respective code interposers 73 into the punch actuating position. At the end of this interval, the feed links 68 and 67 become vertically aligned and the feed rod 61 is driven downward to produce a feeding operation. During the first portion of the next 60° of rotation of the shaft 6, the feed rod 61 is moved upwardly, and the punch bail 35 starts downward and presses the selected code interposers 73 between the bail 35 and the punches 45. In FIGURE 5B, the links 29 and 31 are phase displaced by 180° with respect to the illustration of links 29 and 31 in FIGURE 4. The showing in FIGURE 5B is correct, the phase displacement of links 29 and 31 in FIGURE 4 being due to the fact that in FIGURE 4 the cam follower 11 was rotated 90° from its true position in order to prevent the links 29 and 31 from obscuring the cam 10 and cam follower 11.

Proceeding with the description, at 120° of rotation of the shaft 6, the selected punches have been driven through the record member and the feed rod 61 has been raised to its uppermost position ready for the next feed operation. During the interval from 60 to 120°, the feed interposer 74 has been returned to its spacing or inoperative position by the bell crank 70 pushing against the stud 88 on the feed interposer 74. Downward movement of the lower end of the link 31, resulting from vertical alignment of links 29 and 31 moves the end of the arm 70a connected to the shaft 38 downward causing the bell crank 70 to rotate about its pivot, and causing its vertical arm 70b to move rearwardly. The arm 70b pushes against the stud 88 on the feed interposer 74 and moves the feed interposer rearwardly to its inoperative position. Thus the motion of the punch links 29 and 31 are so related to the overall operating cycle of the mechanism as to provide a suitable motion for producing feed interposer return. As will become apparent subsequently, such an appropriate motion for producing code interposer return is not provided by either of the feed links 68 or 67, or punch links 29 and 31. However, an appropriate motion is available on the drag link 66, intermediate its ends.

During the last 60° of the first half revolution of shaft 6; that is, from 120° to 180°, the feed interposer 74 can again be moved to the feed actuating position and made ready for the next feeding cycle. During the entire interval from 120° to 180°, the punches 45 are withdrawn from the record member and returned to their upper position. During the interval, when the punches are being withdrawn, that is, during the interval from 120° to 180 degrees of rotation of the shaft 6, the punch interposers 73 are reset. At the 180° point of operation both the feed and punch links 67 and 68, and 29 and 31, respectively, are in their uppermost positions with both links being bent to the left. This raises the drag link 66, the drag link lying in a horizontal plane in this position, thereby raising the link 87 and arm 86 and causing the restoring bail 84 to be rotated about the centerline of shaft 85 to press against the punch interposers 73 and return them to their spacing position. It will be noted that when the apparatus is in the 60° position the feed links are in their lowermost position while the punch links are in their uppermost position, these two positions being displaced respectively below and above the point of attachment of the link 87 to the drag link 66 by approximately equal distances. At the 120° position of the shaft 6, the feed links 69 and 68 are withdrawn to their uppermost position and the punch links 29 and 31 are extended to their lowermost position, the feed and punch links being displaced respectively at equal distances above and below the point of attachment of the link 87 to the drag link 66. Therefore, the link 86 is maintained essentially stationary, the drag link 66 effectively pivoting about this point of attachment as a point approximately fixed in space. At the 120° position the left end of drag link 66 is raised and is maintained raised during the next 60° since the surface "a" of the cam 10 engages the upper cam surface of the feed cam follower 12 and the links 67 and 68 remain stationary during the next 60° of rotation of shaft 6. During this interval the links 29 and 31 move from their vertically aligned position toward the left and as the angle between the links 29 and 31 increases the right end of the link 66 is raised. The upper end of the code restoring bail is moved progressively toward the right and provides an increasingly inclined surface in contact with the ends 75 of the code interposers 73 thereby causing them to be reset. Consequently, even though an appropriate timing interval for code interposer reset is not provided by either the feed or punch mechanisms, an appropriate time for code interposer reset is obtained by means of the drag link 66.

Proceeding with the description of the cyclic operation of the apparatus, during the interval from 180 to 240 degrees the feed rod 61 is moved downwardly to produce another feeding operation and, the solenoids 80 are selectively energized to move selected code interposers 73 into the punch actuating position. This cyclic operation of the feed and punch mechanisms continues through 360° of rotation of the shaft 6 and it can be seen that two cycles of operation of these mechanisms are produced during each rotation of the shaft 6.

The electromagnets 80 are excited when the respective bails are at the top of their strokes. At this instant the restoring bail 84 and bell crank 70 have fully reset their associated interposers and the restoring bails are beginning to withdraw. Thus, if the electromagnets are now excited, the interposer restoring mechanism controls the rate at which interposers are inserted in preparation for the next punch or feed cycle. Thus impact of interposers against the feed and punch bail are controlled, and impact against a retreating restoring mechanism is eliminated.

Reviewing the operation of the punch device of the present invention, the constant diameter triangular cam 10 permits allocation of ⅓ of each punch cycle to actuating interposers, ⅓ of a punch cycle to produce punching, and ⅓ to both withdrawal of the punches and resetting of the interposers. This timing applies equally well to the feed mechanism but the punch cycle leads the feed cycle by 240° with respect to shaft rotation which, due to the fact that a punching and feeding cycle occurs each 180° of rotation of the shaft, is equal to a 60° displacement between the operation of the punch bail and the feed bail. The specific angular displacement between the cam followers 11 and 12, although disclosed as 120°, may be 60° or any multiple of 60° that maintains a displacement of 60° between the operation of the punch bail and feed bail since with this angular displacement, setting of the feed interposer occurs while the punches are being withdrawn from the record member following perforation. Proceeding with the description of operation of the punch device, motion ideally timed for feed interposer reset is directly available from and correctly timed by the punch links 29 and 31. A motion ideally timed for code interposer reset is provided at the center of the drag link 66, resetting of the code interposers occurring during withdrawal of the punches. The nearly vertical motion of the center of the drag link 66 follows the basic cam and cam follower motion and occurs in time midway between the occurrence of punch and feed strokes, a time ideally suited to code interposer restoration. Thus, a restoring bail 84 driven with appropriate amplification from the center of the drag link 66 restores all code interposers 73 when both punch bail 35 and feed bail 69 are at the top of their respective strokes. The drag link 66 has an additional function of restraining the lower end of the feed link 67 to follow a substantially vertical motion. The motion of punch and feed bails is of the order of .030 inch. Thus an arc described by the link 66 pivoted around pin 38 provides nearly vertical guiding for the link 67.

The feed drive mechanism has been described as utilizing a feed interposer 74 for selectively actuating the feed mechanism. It is within the scope of the present invention to provide a permanent connection between the feed toggle, links 68—67, and the feed rod 61, to effect feed of the record member during each half cycle of rotation of the shaft 6. The utilization of a selectively actuatable feed mechanism is preferable in that it allows the punch to be operated at any speed up to the synchronous speed as determined by the rate of rotation of the shaft 6. Thus the punch device of the present invention may receive information from various sources, each operating at a different rate without altering the basic operating frequency of the punch apparatus. During those intervals when the feed interposer is not actuated, the punch 46 which punches the feed holes merely reciprocates in the hole it initially punched.

From the above description, it is apparent that the apparatus of the present invention provides a simple, compact and reliable punch device driven from a continuously rotating power source. A basic cyclic motion for operation of the punch and feed mechanisms is created by a constant diameter triangular cam and cam followers which are run in an oil bath and operated at one-half the cyclic rate of the punching and feeding mechanisms to reduce wear of and noise in the mechanism. Mechanisms are provided for positively resetting solenoids 80, interposers 73 and 74 and withdrawal of the punches 45 from the perforated member. Long life of the apparatus has been insured as a result of the reduction of impact loads during the punching operation, the elimination of these loads being accomplished by low velocity of the bail 35 during the interval in which the code interposers 73 and the feed interposer 74 are pressed against their bails. The constant-diameter, triangular cam 10 provides adequate intervals for insertion of the interposers and positive return of the interposers to their spacing position. The feed interposer 74 is returned by a bell crank 70 driven from the punch link, which return interval is ideally timed with respect to the overall operation of the device. Further, the center of drag link 66 provides an ideally timed motion for returning the code interposers to their inoperative position and also acts as a guide for the feed mechanism toggle 67. As a result of the positive resetting of punches and interposers and the utilization of the constant diameter cam, no springs are utilized in the apparatus except for the spring for operating the detent and the rubber snubber on the pawl 58 in operative relation to the ratchet 57, and therefore nearly all resonant effects have been eliminated and the power requirements of the apparatus reduced considerably since spring forces need not be overcome, this also allows increased speed of operation of the apparatus. Further, the feed mechanism is provided with a positive feed indexing arrangement provided by the pawl stop 62 and the detent 63, thereby insuring that the proper spacing between rows of perforations is maintained at all times.

While I have described and illustrated one specific example of the present invention it will be clear that variations of the specific details of construction may be resorted to without departing from the true spirit of the invention as defined in the appended claims.

What I claim is:

1. A device for marking a record member, comprising at least one marking member movable between a spacing position and a marking position, a bail, means for moving said bail between a retracted position and a marking member actuating position, at least one interposer, means for moving said interposer between a first position and a second position, said interposer arranged and adapted in said second position only for operatively coupling said at least one marking member and said bail for a marking operation, a record feed actuator, means for moving said feed actuator from one position to another position, means for maintaining said means for moving in isochronism, link means movable with and interconnecting said bail moving means and said feed actuator moving means and means connected with said link means for returning said interposer to its first position when said link means obtains a predetermined position.

2. The combination in accordance with claim 1 wherein said record feed actuator comprises an extension of said link means.

3. A device for feeding and marking a record member, comprising marking means movable between a retracted position and a marking position, a bail, means for moving said bail between a retracted position and a marking means actuating position, a record feed, a record feed actuator, means for moving said record feed actuator between a retracted position and a feed actuating position, means for maintaining said means for moving in isochronism, feed interposer means movable between one position and another position, said interposer means arranged and adapted in said another position, only, for operatively coupling said record feed and said record feed actuator for a feed operation and means for returning said interposer means to said one position, said last-mentioned means being operated by said means for moving said bail.

4. The combination in accordance with claim 3, further comprising marker interposer means movable between a first and second position, said marker interposer means arranged and adapted in said second position, only, for operatively coupling said marking means and said bail for a marking operation, link means movable with and interconnecting said bail and said record feed actuator and means connected to said link means for returning said marker interposer means to said first position when said link means obtains a predetermined position.

5. The combination in accordance with claim 4 further including a separate solenoid for moving each of said interposers from the first to the second position, said solenoids being selectively energized to move said interposers substantially immediately upon their return to the second position.

6. The combination in accordance with claim 4 wherein said means for maintaining said means for moving in isochronism comprises, constant-diameter triangular cam means, shaft means for rotating said cam means, the axis of said shaft means extending through the center of curvature of one side of said cam means, a first and a second cam follower each having opposed cam engaging surfaces contacting opposed points on the surface of said cam means, said cam followers being reciprocated in at least one plane perpendicular to said shaft upon rotation of said shaft means, a first and a second oscillatable shaft, means for oscillating said first and second oscillatable shafts upon reciprocation of said first and second cam followers respectively and means connecting said bail and said record feed actuator each to a different one of said oscillatable shafts.

7. The combination in accordance with claim 6 wherein said last-mentioned means comprise frequency doubling means.

8. In a punch device having a punch bail for effecting a punch operation and a feed bail for effecting a feed operation and having means for driving said bails in isochronism, said means comprising a rotatable shaft, constant-diameter, three-sided triangular cam means secured to said shaft, the axis of said shaft extending through the center of curvature of one of said sides of said cam means, a first and a second cam follower each having opposed cam means engaging surfaces contacting opposed points on said cam means, said cam followers being reciprocated in at least one plane perpendicular to said shaft upon rotation of said shaft, means for driving said bails including a mechanical coupling between each of said bails and a distinct cam follower, and means for disposing said cam means engaging surfaces of said cam followers at such an angle with respect to one another and said cam means that each of said bails is ineffective to effect its respective operation when the other of said bails is effecting its operation.

9. The combination in accordance with claim 8 wherein each of said mechanical couplings comprises an oscillatable shaft, link means interconnecting said oscillatable shaft and said cam follower, said link means being fixedly secured to said oscillatable shaft and being pivotally secured to said cam follower, and frequency doubling means for driving each of said bails from a different oscillatable shaft.

10. The combination in accordance with claim 8 wherein said cam means comprises a unitary cam elongated along the axis of said shaft.

11. The combination in accordance with claim 8 wherein said cam engaging surfaces of said cam followers may be disposed with respect to one another at an angle of 60° and multiples thereof.

12. In a punch device for perforating a record member, a plurality of punches each having a head end and a punching end, a punch bail having first and second separated and aligned members, said first member having a plurality of apertures for slidably receiving said punches, said head ends of said punches being larger than said apertures in said first section of said bail, means for reciprocating said bail between a retracted and a punching position, a plurality of interposers each disposed between said second member of said punch bail and said head end of a different one of said punches, means for selectively moving said interposers between a first and a second position, said interposers coupling said bail and said punches for a punching operation only when said interposers are in said second position, and a plate having a plurality of apertures each receiving a punching end of a different one of said punches, the relative diameters of the apertures in said plate and said punching ends of said punches being such that viscous oil disposed in the apertures prevents the unselected punches from falling against the record member.

13. The combination in accordance with claim 12, further comprising a feed mechanism for the record member, movable between one and another position, link means interconnecting said means for reciprocating said bail and said feed mechanism, and means interconnecting said link means and said means for returning said interposures to actuate said means for returning upon said link means obtaining a predetermined position.

14. The combination in accordance with claim 13 wherein said feed mechanism comprises a feed bail reciprocable between a terminal and a feed actuating position, said feed bail comprising an end of said link means.

15. The combination in accordance with claim 14 wherein said feed mechanism further comprises a feed rod, a feed interposer movable between a first and a second position, a selectively energizable solenoid for moving said feed interposer to said second position, said feed interposer coupling said feed bail and said feed rod for feeding operation only when in said second position and means driven by said punch bail for returning said feed interposer to said first position.

16. The combination in accordance with claim 13 wherein said feed mechanism comprises a pawl and ratchet, means for decelerating said ratchet, and means for positively positioning said ratchet at the end of each feeding operation.

17. A device for marking a record member comprising at least one marking member movable between a spacing position and a record member marking position, a [reciprocatable] *reciprocable* bail, means for reciprocating said bail, means for selectively coupling said marking member to said bail for movement thereby, said means for reciprocating said bail maintaining said bail in a fixed position while selectively coupling said marking member to said bail for an interval determined by the interval required to move said first member from its first position to its second position.

18. A device for marking a record member comprising at least one marking member [reciprocatable] *reciprocable* between a spacing position and a record marking position, a [reciprocatable] *reciprocable* bail, cyclic means for reciprocating said bail, said cyclic means establishing a cycle of operation wherein said bail is moved in accordance with a complex sine wave function during approximately two-thirds of the cycle of operation and remains stationary during approximately one-third of the cycle of operation and means for selectively coupling said marking member to said bail during the stationary interval of said bail.

19. A device for moving a record member comprising a record moving means [reciprocatable] *reciprocable* between a spacing position and a record moving position, a [reciprocatable] *reciprocable* bail, cyclic means for reciprocating said bail, said cyclic means establishing a cycle of operation wherein said bail is moved in accordance with a complex sine wave function during approximately two-thirds of the cycle of operation and remains stationary during approximately one-third of the cycle of operation, [and] means *when actuated* for [selectively] coupling said moving means to said bail during the stationary interval of said bail, *and means for at will actuating said means for coupling.*

20. A drive assembly for at least two interrelated operating mechanisms, said assembly comprising a rotatable shaft, constant-diameter, three-sided triangular cam means secured to said shaft, the axis of said shaft extending through the center of curvature of one of said sides of said cam means, at least two cam followers each having opposed cam means engaging surfaces contacting opposed points on said cam means, said cam followers being reciprocated in at least one plane perpendicular to said shaft upon rotation of said shaft, means for driving said mechanisms including a mechanical coupling between each of said mechanisms and a distinct cam follower, and means for disposing said cam means engaging surfaces of said cam followers at such an angle with respect to one another and said cam means that each of said mechanisms is ineffective to effect its respective operation when the other of said mechanisms is effecting its operation.

21. A record member punching and feeding apparatus comprising at least one movable punch for punching the record member, a movable punch bail, a punch bail actuating mechanism movable between a spacing and a punching position, a record feed actuator, a movable feed bail formed on one end of a link, means for moving said feed bail between a spacing and a record feed position, said link having its other end connected to said punch bail, a punch interposer having a spacing position and a position for coupling said punch to said punch bail for movement thereby, means for moving said punch bail from a spacing to a coupling position, a punch interposer return mechanism for returning said punch interposer to its spacing position and means interconnecting a portion of said link intermediate its ends and said return mechanism to actuate said return mechanism upon said link obtaining a predetermined position.

22. The combination in accordance with claim 21 further comprising a feed interposer movable between a spacing position and a record feed position, to couple said feed bail to said record feed actuator, means for moving said feed actuator to a record feed position and means connected to said punch bail for returning said feed interposer to said spacing position.

23. A device for marking a record member comprising at least one marking member [reciprocatable] *reciprocable* between a spacing position and a record marking position, a [reciprocatable] *reciprocable* bail, cyclic means for reciprocating said bail, said cyclic means establishing a cycle of operation wherein said bail is moved in accordance with a predetermined function during a first portion of its cycle and remains stationary during a second portion of its cycle, and means for selectively coupling said marking member to said bail during the stationary interval of said bail.

24. The combination in accordance with claim 23 wherein said predetermined function is a cyclic function.

25. A device for moving a record member comprising a record moving means [reciprocatable] *reciprocable* between a spacing position and a record moving position, a [reciprocatable] *reciprocable* bail, cyclic means for reciprocating said bail, said cyclic means establishing a cycle of operation wherein said bail is moved in accordance with a predetermined function during a first portion of its cycle and remains stationary during a second portion of its cycle, [and] means *when actuated* for [selectively] coupling said moving means to said bail during the stationary interval of said bail, *and means for at will actuating said means for coupling.*

26. The combination in accordance with claim 25 wherein said predetermined function is a cyclic function.

27. In combination, an operating member movable between a retracted and an extended position, a bail, means for moving said bail between a retracted and an extended position, interposer means movable between a first and a second position, said interposer means arranged and adapted in said second position to couple said operating member to said bail for movement of said operating member from said retracted to said extended position, a selectively energizable electromagnetic means having an armature movable from one position and another position upon energization of said electromagnetic means, means for moving said interposer means from said first position to said second position upon movement of said armature from said one position to said other position, and magnetic means for retaining said armature in said one position when said electromagnetic means is deenergized.

28. A drive assembly for at least two interrelated operating mechanisms, said assembly comprising a rotatable shaft, constant-diameter, three-sided triangular cam means secured to said shaft, the axis of said shaft extending through the center of curvature of one of said sides of said cam means, at least two cam followers each having at least one surface contacting a point on said cam means, means including said cam means for reciprocating said cam followers in at least one plane perpendicular to said shaft upon rotation of said shaft, means for driving said mechanisms including a mechanical coupling between each of said mechanisms and a distinct cam follower, and means for disposing said cam means engaging surfaces of said cam followers at such an angle with respect to one another and said cam means that each of said mechanisms is ineffective to effect its respective operation when the other of said bails is effecting its operation.

29. A drive assembly for at least two interrelated operating mechanisms, said assembly comprising a rotatable shaft, constant-diameter, cam means secured to said shaft, the axis of said shaft extending through the center of curvature of one of said sides of said cam means, at least two cam followers each having opposed cam means engaging surfaces contacting opposed points on said cam means, said cam followers being reciprocated in at least one plane perpendicular to said shaft upon rotation of said shaft, means for driving said mechanisms including a mechanical coupling between each of said mechanisms and a distinct cam follower, and means for disposing said cam means engaging surfaces of said cam followers at such an angle with respect to one another and said cam means that each of said mechanisms is ineffective to effect its respective operation when the other of said bails is effecting its operation.

30. A device for [making] *marking* a record member, comprising at least one marking member movable between a spacing position and a marking position, a bail, means for moving said bail between a retracted position and a marking member actuating position, at least one interposer, means for moving said interposer between a first position and a second position, said interposer arranged and adapted in said second position only for operatively coupling said at least one marking member and said bail for a marking operation, a record feed actuator, means for moving said feed actuator from one position to another position, means for maintaining said means for moving in isochronism at a predetermined phase displacement, a movable member, means for moving said movable member in accordance with a predetermined function of the relative phases of the movements of said means for moving, and means for returning said interposer to its first position upon said movable member obtaining a predetermined position.

31. In combination a first [reciprocatable] *reciprocable* member, means for reciprocating said first member, a second *reciprocable* [reciprocatable] member, means for reciprocating said second member, drive means for maintaining said means for moving in isochronism, a link connected between said first member and said second member, a third member movable between at least a first position and a second position, a driven member, said third member adapted and arranged in one of said positions for operatively coupling said driven member to one of said [reciprocatable] *reciprocable* members for imparting motion to said driven member, and means connected to said link intermediate its ends for moving said third member from at least said first position to said second position when said link obtains a predetermined position.

32. In combination a first *reciprocable* [reciprocatable] member, means for reciprocating said first member, a second *reciprocable* [reciprocatable] member, means for reciprocating said second member, drive means for maintaining said means for moving in isochronism at a predetermined phase displacement, a movable member, means for moving said movable member in accordance with a predetermined function of the relative phases of the movements of said [reciprocatable] *reciprocable* means, a third member movable between at least a first position and a second position, a driven member, said third member adapted and arranged in one of said positions for operatively coupling said driven member to one of said [reciprocatable] *reciprocable* members for imparting motion to said driven member, and means connected to said movable member for moving said third member from at least said first position to said second position when said movable member obtains a predetermined position.

33. A device for performing an operation upon a record member, comprising a [reciprocatable] *reciprocable* member, means for reciprocating said member, said means including drive means for establishing a cycle of operation such that said member is moved during at least one portion of its cycle in accordance with a predetermined function having relatively low terminal velocities and relatively high intermediate velocities and is maintained substantially stationary during at least a second portion of the cycle which constitutes a substantial fraction of the cycle, a movable member for performing an operation upon a record member [when actuated], means *when actuated* for [selectively] connecting said movable member [in actuating relationship] to said [movable] *reciprocable* member, and means for [effecting the connection between] *at will actuating said means for connecting* said members during at least a part of said second portion of the cycle of operation.

34. The combination in accordance with claim 33 wherein said drive means comprises *a constant-diameter,* triangular cam and cam follower means.

35. The combination in accordance with claim 33 wherein said drive means comprises a constant diameter, *triangular* cam and a cam follower having two opposed surfaces in contact with said cam.

36. In a punch device, a record punching mechanism, a record feeding mechanism for feeding material to be punched to said punching mechanism, and means for driving said mechanisms in isochronism and in accordance with a predetermined cyclic function including intervals during which at least one of said mechanisms is stationary, said means comprising constant diameter, three-sided triangular cam means, cam follower means having opposed surfaces displaced by a distance approximately equal to the diameter of said cam means, means for rotating said cam means so as to maintain said cam means in contact with said opposed surfaces of said cam follower means at all times and means for coupling said cam follower means to said mechanisms so as to maintain said mechanisms in isochronism.

37. The combination in accordance with claim 36 wherein said means for rotating comprises a single shaft, said shaft having its axis passing through the center of curvature of one of said sides of said cam means.

38. The combination in accordance with claim 36 wherein said cam follower means includes more than one cam follower.

References Cited in the file of this patent or the original patent

UNITED STATES PATENTS

| | | |
|---|---|---|
| 2,397,112 | Hueber | Mar. 26, 1946 |
| 2,536,955 | Palmer | Jan. 2, 1951 |
| 2,555,750 | Luhn | June 5, 1951 |